United States Patent
Bloo et al.

[11] Patent Number: 5,184,379
[45] Date of Patent: Feb. 9, 1993

[54] FOIL STRETCHING PLANT

[75] Inventors: Johann Bloo, Seewalchen; Ewald Romauer, Vöcklabruck; Alois Hollerwöger, Lenzing, all of Austria

[73] Assignee: Lenzing Aktiengesellschaft, Lenzing, Austria

[21] Appl. No.: 653,256

[22] Filed: Feb. 11, 1991

[30] Foreign Application Priority Data

Feb. 15, 1990 [AT] Austria ............... A 347/90

[51] Int. Cl.⁵ .............................................. D06C 3/00
[52] U.S. Cl. ............................................ 26/72; 26/51
[58] Field of Search ............... 26/71, 72, 73, 99, 100, 26/51, 76; 264/288.4, DIG. 65; 425/DIG. 53, 66; 28/240

[56] References Cited

U.S. PATENT DOCUMENTS

| 2,753,533 | 7/1956 | Miller | 26/73 |
| 3,765,067 | 10/1973 | Fisher | 26/72 |
| 3,890,421 | 6/1975 | Habozit | 26/72 |

FOREIGN PATENT DOCUMENTS

| 302634 | 3/1969 | Austria. |
| 298776 | 5/1972 | Austria. |
| 1919299 | 10/1970 | Fed. Rep. of Germany. |
| 1704757 | 2/1971 | Fed. Rep. of Germany. |
| 2611134 | 9/1977 | Fed. Rep. of Germany. |

*Primary Examiner*—Werner H. Schroeder
*Assistant Examiner*—Amy Brooke Vanatta
*Attorney, Agent, or Firm*—Keck, Mahin & Cate

[57] ABSTRACT

Foil stretching plant comprising a plurality of zones, more particularly a heating zone I, a stretching zone II, a stabilizing zone III and a cooling zone IV. The individual zones I, II, III and IV are designed as modules which can be installed and removed individually. Of these, at least the module designed as a stretching zone II can be installed upside down and can succeed in upside down position a first stretching zone II. In that arrangement the second stretching module can replace a stabilizing zone III.

9 Claims, 5 Drawing Sheets

FOIL STRETCHING PLANT

BACKGROUND AND FIELD OF THE INVENTION

The invention relates to a foil stretching plant to be used for the stretching of films or foils of synthetic polymers of various chemical compositions, resulting in final products having a broad range of properties.

To date it has been the practice to adapt the manufacturing process, and in particular the stretching of foils to the properties of the final product and to optimize the process parameters accordingly.

It is an object of the invention, by reconstruction of the entire plant, to employ for the stretching of films having totally different properties, e.g. in respect of polymer, thickness, stretching or strength stretching apparatus, which had previously for example been used for the manufacture of a film of defined properties.

These final properties are determined by process parameters prevailing during stretching, such as degree of stretching, stretching temperature, withdrawal rate etc. Foils exist which can be processed more effectively after stretching over a short gap and those which are rather obtained by long gap stretching.

The present day foil market demands a multitude of optimized products. Machines for producing those products must be capable of being employed in a variety of manners.

GENERAL DESCRIPTION OF THE INVENTION

The present invention has an object to overcome the aforesaid difficulties and to provide a plant which makes it possible to manufacture in a simple manner foils with the described final properties. This object is attained by the feature that a plurality of zones are provided in series in the direction of the course of production of which at least one is a heating zone, one a stretching zone, one a stabilizing zone and one a cooling zone, each of the aforesaid zones comprising a plurality of rollers extending parallel to one another, over which the said foil passes, and at least some of the aforesaid zones are designed as releasable and interchangeable modules.

According to a further feature of the invention, the heating zone comprises at least three successive heating rollers. In this context the heating rollers are preferably arranged successively staggered upwardly and downwardly, viewed in the horizontal direction.

Depending on the nature of the material to be processed, the temperature and rotation of these rollers must be adjusted optimally which is cumbersome. As a further important feature of the invention in this context, a combination is provided of driven and non-driven rollers. In addition these rollers are in no way interconnected by gears or otherwise as was hitherto conventional, i.e. as corresponded to the state of the art.

After the heating zone the foil passes through the stretching zone. Depending on the arrangement of the various rollers, the foil may be processed according to a short gap or long gap stretching method.

During stretching energy is released. In some materials, specifically at high velocities, this results in overheating, damage or melting through in that region. Such foils can be stretched without problems according to the long-gap stretching method.

A further advantage of the modular construction is that it permits to install the stretching part of the stretching plant more than once. In that case the second stretching module may be installed in reverse, more particularly upside down, so that in that case the stabilizing zone can be dispensed with. The preheating rollers forming part of the stretching portion and which in the first stretching zone precede the stretching rollers and must first be passed by the film prior to stretching will be passed by the film in the second stretching zone only after the passage of the film over the stretching rollers. In that case the preheating rollers assume the task of the stabilizing zone.

In this special embodiment a variety of stretching processes can be combined with one another whereby a variety of properties may be attained.

It is thus possible to intercombine long-long, short-short, short-long and long-short gap stretching processes.

After leaving the stabilizing zone the film is passed through a cooling zone.

Further features of the invention are explained with reference to the accompanying drawings.

DESCRIPTION OF SPECIFIC EMBODIMENTS

Figure 1:
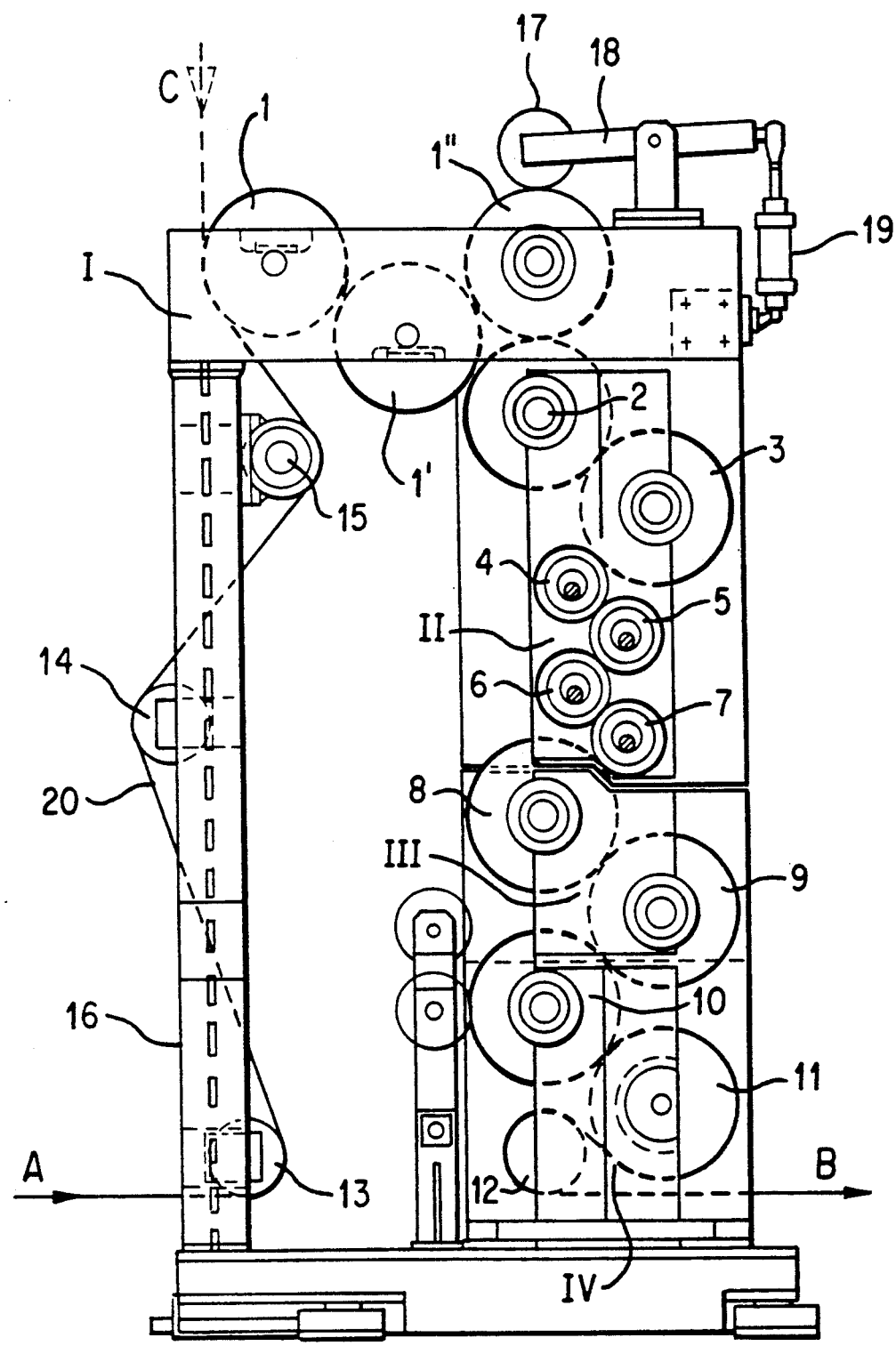
FIGS. 1 and 2 each represent in a simplified form in side elevation an embodiment of the foil stretching plant according to the invention for short gap stretching.
Figure 3:
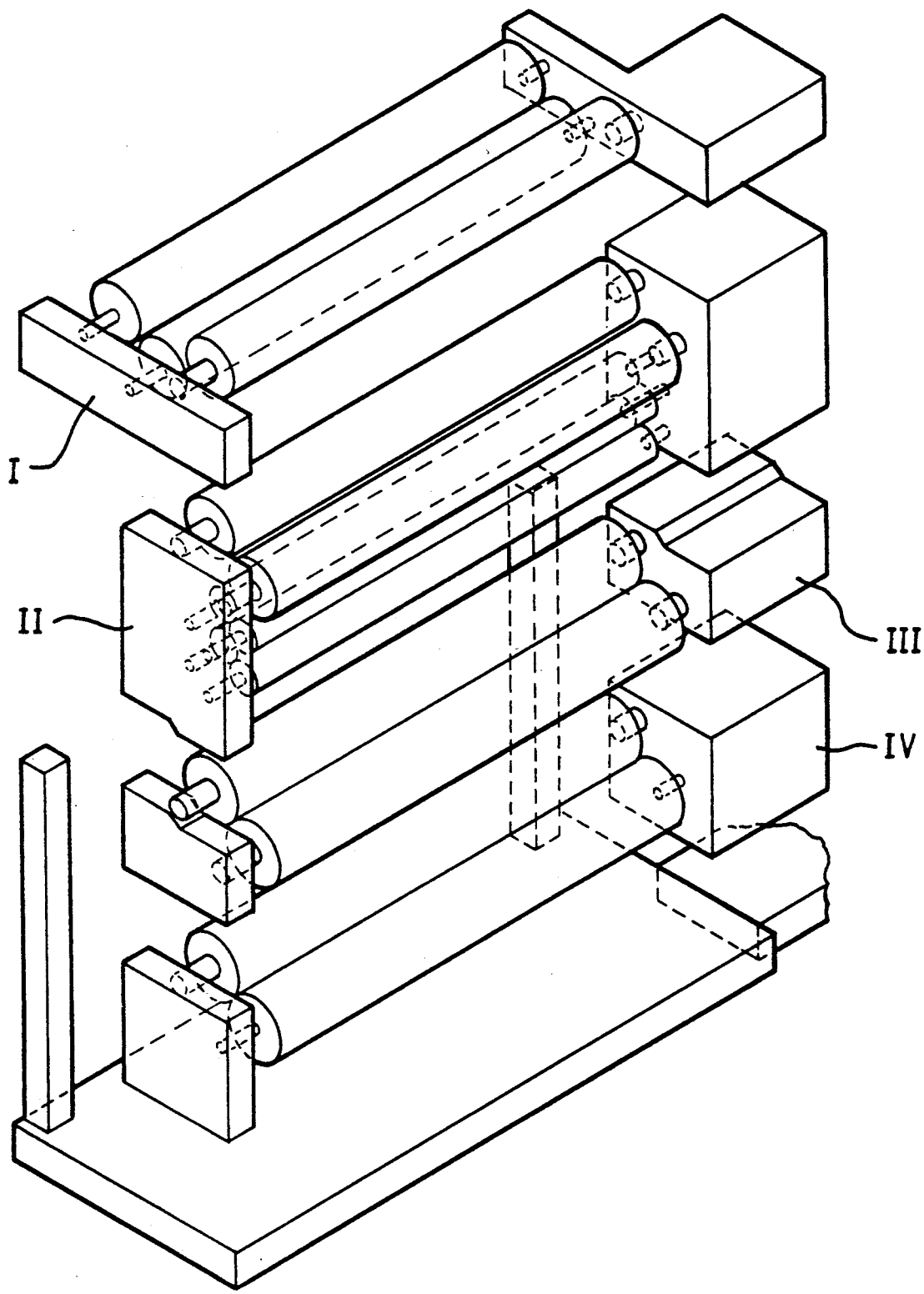
FIG. 3 represents the plant according to FIG. 1 in an exploded isometric view, wherein the individual zones are illustrated separated from one another.

FIG. 1 illustrates a foil stretching plant comprising four successive zones, more particularly a heating zone I, a stretching zone II, a stabilizing zone III and a cooling zone IV, wherein each of the four zones is designed as a distinct module and all modules are interconnected releasably as indicated diagrammatically in FIG. 3. In addition, individual modules can be mutually interchangeable or interchangeable with other modules. In addition there is provided the possibility to provide individual modules more than once, e.g. in series with one another.

The feed locality of the still unstretched foil 20 is indicated by arrow A. The foil 20 is deflected upwardly to the module of the heating zone 1 by guide rollers 13, 14, 15 which are mounted on a carrier. The foil 20 may also be introduced by way of arrow C (FIGS. 1 and 2), e.g. in the case of blow foil plant.

The module of the heating zone I comprises three horizontal and successively alternatingly upwardly and downwardly staggered preheating rollers 1, 1' and 1", of which the roller 1" is driven. The roller 1" is acted upon by a pressure roller 17, mounted at the end of a double armed lever 18 and serving as a holding locality. Due to the provision of specific spiral groove configuration, it also provides a polishing and lateral retention effect. The lever 18 is connected to a hydraulic or pneumatic cylinder 19 at that arm of the lever which is remote from the pressure roller 17. The next lower module of the stretching zone II comprises on the feed side preheating rollers 2 and 3 one below the other and laterally staggered, of which the preheating roller 3 is driven. By this combination of driven and non-driven rollers which moreover are not interconnected, it is possible to process a variety of films such as PE, PET, PP etc in a single plant. Which rollers are driven and which are non-driven, depends on the temperature program (=different degrees of longitudinal stretching of the foil) and the material of the foil.

Each preheating roller has its own heating cycle in order to provide a specific temperature program.

Figure 4:
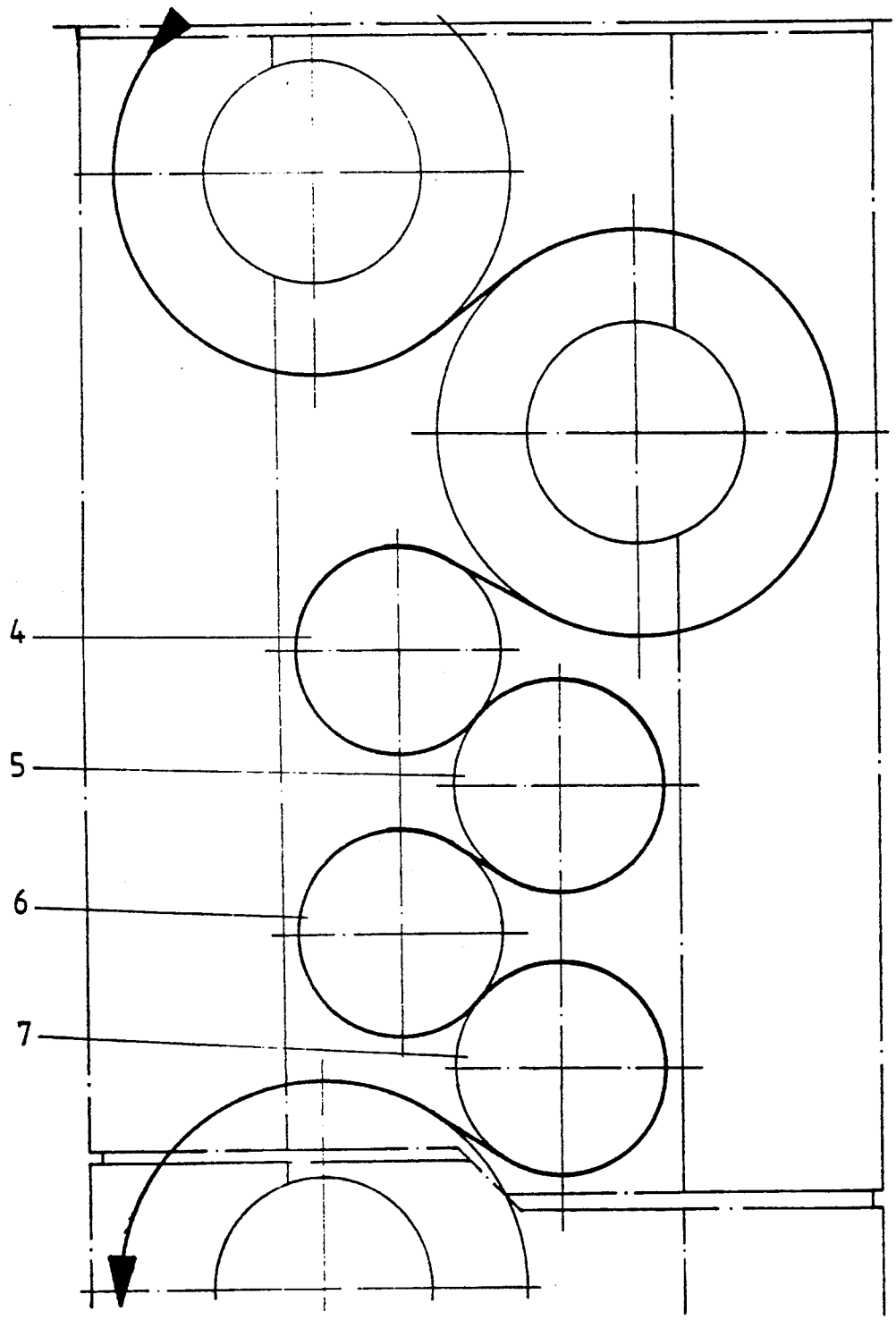
FIG. 4 represents a diagrammatic view of the arrangement of the stretching rollers in the stretching zone for a short gap stretching method.

In the module comprising the stretching zone II, four stretching rollers 4 to 7 are provided one below the other, alternatingly laterally staggered, following onto the preheating rollers 2, 3. The rollers 5 and 6 are steel rollers which are heated. The rollers 4 and 7 are heated, have rubber surfaces and serve for increasing the moment of friction. These four rollers 4 to 7, jointly with the roller bearings can be mutually interchanged in a simple manner. In FIGS. 1 and 4 the stretching zone II is illustrated in the context of a foil stretching plant for shortgap stretching.

In order to convert the plant from short-gap stretching to long-gap stretching according to FIG. 5, the steel roller 6 is replaced by the roller 7 having a rubber surface or being rubber-coated, so that in each case the two steel rollers 5 and 6 on the one hand and the rubber-coated rollers 4 and 7 on the other hand are positioned below one another. In this case the foil 20 does not pass from the steel roller 5 directly, respectively by way of a short gap as apparent from FIG. 4, but by way of a long-gap "a" to the steel roller 6 and from the rubber coated roller 7
to the stabilizing roller described further below of the subsequent zone III.

According to the previously known state of the art, the interchanging of the rollers takes place by drawing the bearing housings off the roller axle pins.

A simplified version of roller interchange, e.g. by means of bayonet connections, quick tensioning devices, slot-shaped guide means etc. is of course possible as well. The bearing housings, outer diameters and housing wall bores (module) remain the same.

The bearing housings of the rubber surfaced or rubber coated stretching rollers 4 and 7 comprise adjustment means for setting the gap height and a spring assembly such that in the event of thick regions in the foil and if the foil should tear off (in practice the foil will wind up around the stretching roller which is rubber-coated or provided with a rubber surface), the roller having a surface of rubber or coated with rubber can be displaced when its size increases.

In the event of the foil tearing, the latter winds up on the stretching roller. After the diameter has increased by 2 mm the plant is switched off by a limit switch.

The module representing the stabilizing zone III comprises two mutually laterally staggered stabilizing rollers 8 and 9, one below the other.

The former module is followed by a further module acting as a cooling zone IV and comprising two laterally staggered cooling rollers 10 and 11, one below the other. In addition a deflecting roller 12 for outwardly deflecting the foil is provided. The discharge region for the stretched foil is denoted by the arrow B. At least one of the cooling rollers may be water-cooled.

Figure 2:
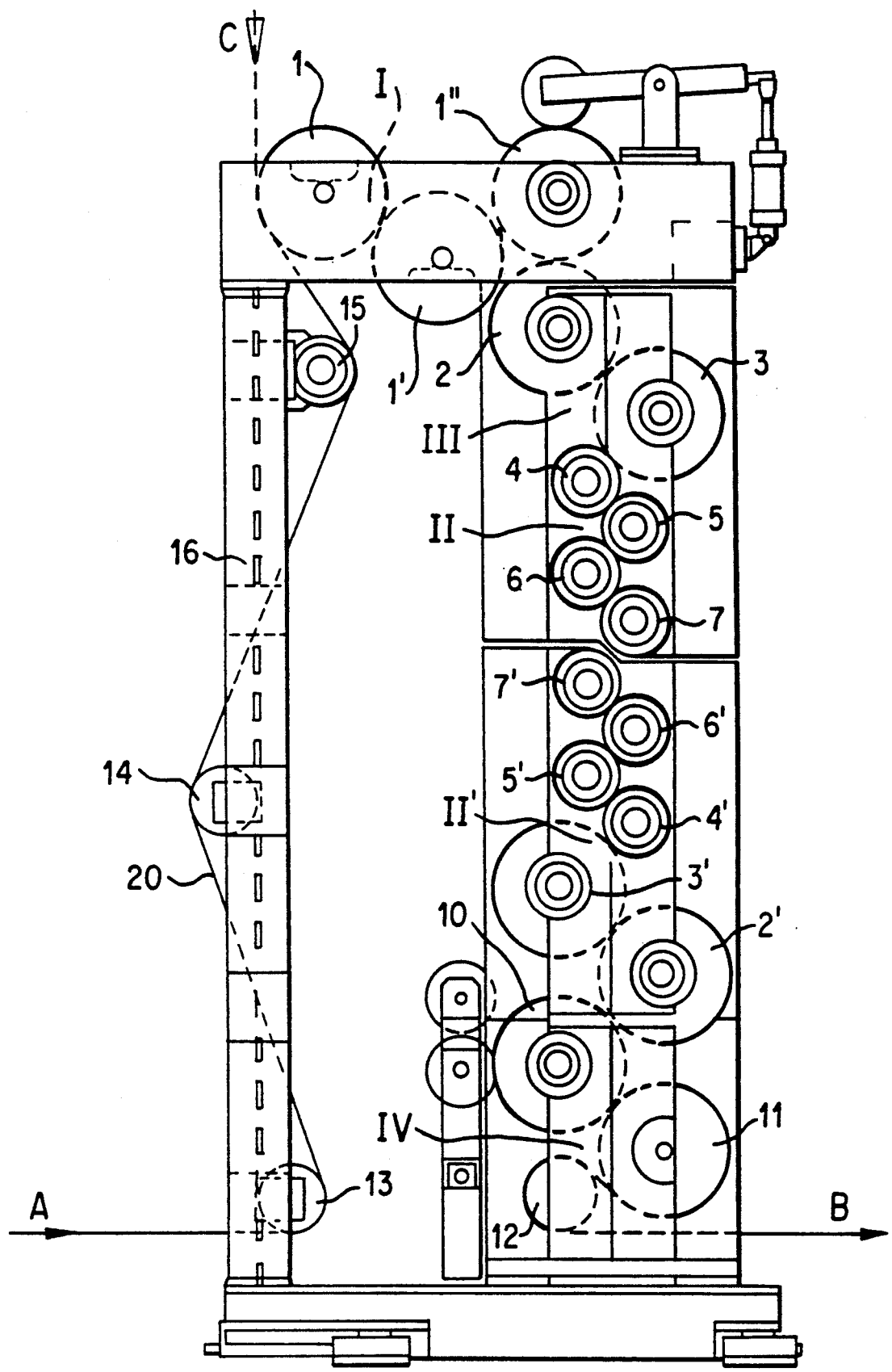

In the embodiment according to FIG. 2 a second module II' of the stretching zone II is installed upside down in place of the module of the stabilizing zone III, in which case, the preheating rollers 2', 3' assume the task of the stabilizing roller 8, 9. The rollers 4' to 7' correspond in respect of installation and construction to the rollers 4 to 7.

Figure 5:
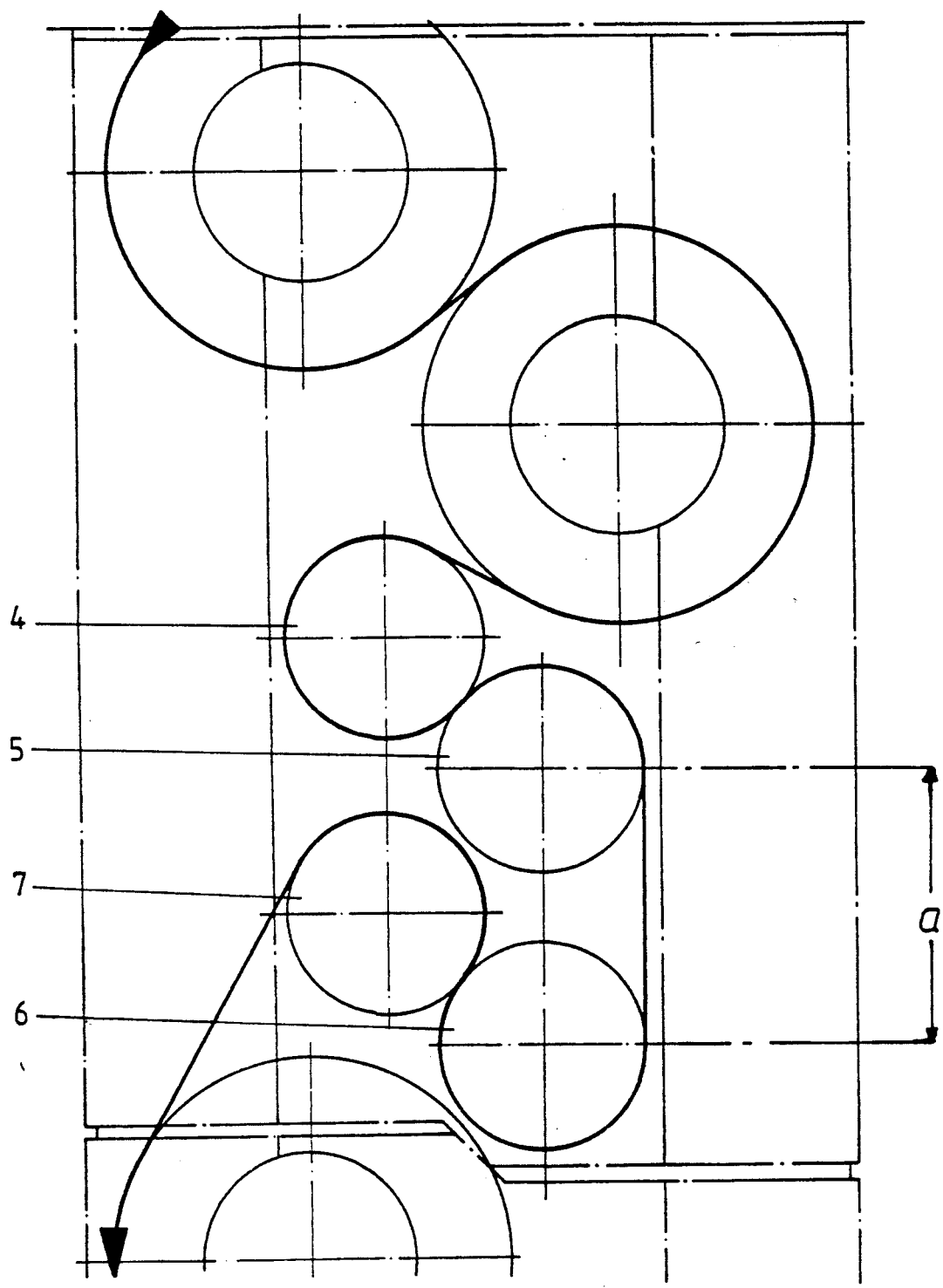
FIG. 5 represents a diagrammatic view of the arrangement of the stretching rollers in the stretching zone for a long-gap stretching process.

When two stretching zones II are provided, it is possible to design these according to either of the embodiments of FIG. 4 or FIG. 5 or one in accordance with FIG. 4 and the other in accordance with FIG. 5, thereby providing the facilities for conducting the aforesaid long-long, short-short, short-long and long-short gap stretching methods.

For purposes of short gap stretching the foil between rollers having rubber surfaces wraps around more than half the circumference of at least two steel rollers. For long-gap stretching the foil passes straight between rollers having rubber surfaces in the stretching zone between at least two steel rollers along a common tangent.

The preheating roller is connected to a heating unit, the stabilizing roller to a tempering means (combination heating and cooling unit). For the preheating roller and the stabilizing roller a heat exchanger oil serves as the heating, respectively cooling medium. For the long-long gap stretching process two modules according to FIG. 5 are installed one above the other; for the short-short gap stretching process two modules according to FIG. 4 are installed one above the other; for the long-short gap stretching process one module according to FIG. 5 and one according to FIG. 4 are installed one above the other; for the short-long gap stretching process one module according to FIG. 4 and one according to FIG. 5 are installed one above the other.

WORKING EXAMPLE

Material LLDPE
Feed velocity 50 m/min
Preheating temperature 20 to 120° C.-short gap process
Stretching temperature 120° C.
Stretching ratio 1:5
Discharge velocity 250 m/min
Film properties:
stretching 100%
Feed thickness 150 μm    Exit thickness 30 μm
Tensile strength 200 N/mm$^2$ It stands to reason that within the scope of the invention, various constructional modifications can be performed. Thus, it is possible to dispense with the preheating rollers 1, 1'. Furthermore, the roller 11 can be provided with a pressure roller similar to that which is denoted as 17. Likewise a plurality of preheating rollers, stabilizing rollers and cooling rollers may be provided.

We claim:

1. Foil stretching plant for processing films or foils comprising a plurality of zones arranged successively in series in the direction of foil production wherein at least one zone is a preheating zone, one zone is a stretching zone, one zone is a stabilizing zone and one zone is a cooling zone; each of the aforesaid zones comprising a plurality of rollers parallel to one another of varying diameter in the different zones over which the said foil passes; at least some of the said zones being designed as releasable and interchangeable modules, which are arranged one above the other.

2. Plant according to claim 1, wherein the stretching zone comprises at least two successive preheating rollers and in succession thereto at least four stretching rollers.

3. Plant according to claim 2, wherein at least one of the said stretching rollers is installed in a releasable manner.

4. Plant according to claim 2, wherein the stretching zone is capable of being installed upside down, so that the stretching rollers precede the preheating rollers.

5. Plant according to claim 1, wherein the preheating zone comprises a least three heating rollers successively arranged in a horizontal direction, which are alternatively upwardly and downwardly staggered.

6. Plant according to claim 2, wherein at least one of the preheating rollers of the stretching zone is non-driven, whereas another preheating roller is independently driven, provision being made for a combination of driven and non-driven rollers to be employed.

7. Plant according to claim 2, characterized in that at least individual stretching rollers are heatable, some thereof being designed as steel rollers and some thereof comprising a rubber surface, the rollers being mutually interchangeable.

8. Plant according to claim 7, wherein for short-gap stretching, the foil located between rollers having rubber surfaces wraps around more than half the circumference of at least two steel rollers.

9. Plant according to claim 7, wherein for long-gap stretching, the foil positioned between rollers with rubber surfaces in the stretching zone passes straight between at least two steel rollers along a common tangent.

* * * * *